United States Patent
Masaki

(10) Patent No.: US 8,428,112 B2
(45) Date of Patent: Apr. 23, 2013

(54) PARAMETER CONTROL CIRCUIT

(75) Inventor: Shunichiro Masaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1173 days.

(21) Appl. No.: 12/236,375

(22) Filed: Sep. 23, 2008

(65) Prior Publication Data

US 2009/0016421 A1    Jan. 15, 2009

Related U.S. Application Data

(63) Continuation of application No. PCT/JP2006/305856, filed on Mar. 23, 2006.

(51) Int. Cl.
*H03H 7/30* (2006.01)

(52) U.S. Cl.
USPC ........... 375/232; 375/229; 375/230; 375/234; 375/136; 375/147

(58) Field of Classification Search .................. 375/232, 375/136, 147, 229, 230, 233; 331/17; 708/300, 708/819
See application file for complete search history.

(56) References Cited

U.S. PATENT DOCUMENTS

| | | | |
|---|---|---|---|
| 5,526,200 A * | 6/1996 | Yada | 360/51 |
| 6,097,767 A * | 8/2000 | Lo et al. | 375/327 |
| 7,760,799 B2 * | 7/2010 | Lai et al. | 375/233 |

FOREIGN PATENT DOCUMENTS

| | | |
|---|---|---|
| JP | 7-182785 A | 7/1995 |
| JP | 11-220342 A | 8/1999 |
| JP | 2003-257133 A | 9/2003 |
| JP | 2005-166175 A | 6/2005 |
| JP | 2005-259317 A | 9/2005 |
| JP | 2005-267725 A | 9/2005 |
| JP | 2006-060381 A | 3/2006 |

* cited by examiner

*Primary Examiner* — Dhaval Patel
(74) *Attorney, Agent, or Firm* — Arent Fox LLP

(57) ABSTRACT

An interface circuit inputting and outputting data and a clock that have multiple speeds is provided with an equalizer capable of changing a circuit parameter, a frequency detection part detecting a clock frequency, and a parameter calculation control part calculating an appropriate circuit parameter according to the clock frequency and controlling the equalizer. The frequency detection part detects at what frequency the interface circuit is operating presently and sends the frequency to the parameter calculation control part. The parameter calculation control part calculates the circuit parameter of the equalizer so that the interface circuit operates optimally at the detected frequency, and sets the circuit parameter to the equalizer. In this manner, since the circuit parameter of the equalizer in the interface circuit can be controlled appropriately according to the frequency of the input and output clock, optimum operation is always available.

7 Claims, 9 Drawing Sheets

PARAMETER CONTROL CIRCUIT

CROSS-REFERENCE TO RELATED APPLICATION

This application is a Continuation Application of International Application No. PCT/JP2006/305856, filed Mar. 23, 2006, designating the U.S., the entire contents of which are incorporated herein by reference.

BACKGROUND

1. Field

The present embodiment relates to a parameter control circuit controlling circuit characteristics automatically according to an operation clock in an interface circuit, a clock generation circuit, or the like which inputs and outputs a digital signal in high speed between or within LSI (large Scale Integrated Circuit) devices, between boards, between apparatuses, or the like.

2. Description of the Related Art

Recently, in the computer field and the telecommunication field, information amount to be processed has been dramatically increased and performance improvement of the entire system has been required. To improve the performance of the system, it is necessary to improve performance in apparatuses including the system and each component configuring the apparatuses. For example, high speed operation has been realized in memories such as SRAM (Static Random Access Memory) and DRAM, processors, LSIs for network switching, etc.

Meanwhile, it is necessary to process a digital signal in high speed for signal transmission between LSI devices, signal transmission between multiple elements within the LSI device or between circuit blocks, signal transmission between boards or network apparatuses, etc. In particular, it is required to realize a high speed interface circuit inputting and outputting a signal between LSI devices, elements, boards, and apparatuses.

However, frequently these interface circuits are required to have downward compatibility and need to operate at two or more operation frequencies. For example, the HDMI (High-Definition Multimedia Interface: digital interface for image) operates at a lower frequency for a lower resolution and operates at a higher frequency for a higher resolution. Further, the USB (Universal Serial Bus: general-purpose serial interface) has different operation speeds between Ver. 1.1 and Ver. 2.0. Similarly, the PCI (Peripheral Component Interconnect) Express (personal computer interface) has two versions, Gen 1 and Gen 2, and the SATA (Serial Advanced Technology Attachment: hard disk interface) has Ver. 1 and Ver. 2 which are different in speed.

In particular, serial interface circuits are recently used frequently and such serial interface circuits include analog circuits operating at ultrahigh speeds. The analog circuits are not always easy to operate at lower clock frequencies differently from digital circuits and operate optimally only in certain ranges.

To solve such a problem, there is an idea to realize different circuit characteristics by changing circuit parameters thereof. For example, a parameter for frequency is preliminarily stored in a ROM (Read Only Memory) or the like and the circuit characteristics are changed by selecting the parameter stored in the ROM. As such a conventional technique, a document (Japanese Laid-open Patent Publication No. H11-220342) discloses a technique changing a bias in an electric power amplification circuit.

As described above, a typical analog circuit configuring the interface circuit has a tendency to operate optimally in a certain frequency range, and it is difficult to design a circuit operating always optimally in the interface circuit which inputs and outputs a signal with a low speed to a high speed. When designed unreasonably, the analog circuit sometimes has a performance deteriorating significantly outside a limited frequency range.

Further, if the parameter is preliminarily stored in the ROM or the like as disclosed in the above document, when kinds of the interfaces increase, kinds of the operation speeds increase and operation modes are diversified in future, it becomes necessary to update data stored in the ROM in each case. And further, it becomes difficult to manage what circuit corresponds to what version of the interface.

SUMMARY

According to one aspect of the present invention, a parameter control circuit includes an interface circuit inputting and outputting data and a clock that have multiple speeds, a frequency detection part detecting a frequency of the clock, an equalizer changing characteristics of the interface circuit and a parameter calculation control part calculating a circuit parameter of the equalizer and controlling characteristics of the equalizer according to the frequency detected by the frequency detection part.

According to another aspect of the present invention, a parameter control circuit includes an interface circuit inputting and outputting data that has multiple speeds, a clock recovery part recovering a clock from the data, a frequency detection part detecting a frequency of the clock recovered by the clock recovery part, an equalizer changing characteristics of the interface circuit and a parameter calculation control part calculating a circuit parameter of the equalizer and controlling characteristics of the equalizer according to the frequency detected by the frequency detection part.

DETAILED DESCRIPTION OF THE EMBODIMENTS

A parameter control circuit according to the present embodiment is used in an interface circuit and clock circuit inputting and outputting data and is a control circuit which can change circuit characteristics thereof automatically according to an operating frequency. Hereinafter, some embodiments of the parameter control circuit will be described with reference to the drawings. Note that, in each of the embodiments, sending and receiving data and a clock signal, although a generation apparatus thereof is not particularly shown, are supplied by an apparatus that uses the interface circuit, a transmission line, etc.

First, some examples of the interface circuit common to each of the embodiments to which the parameter control circuit according to the present embodiment is applied will be described.

Figure 1:
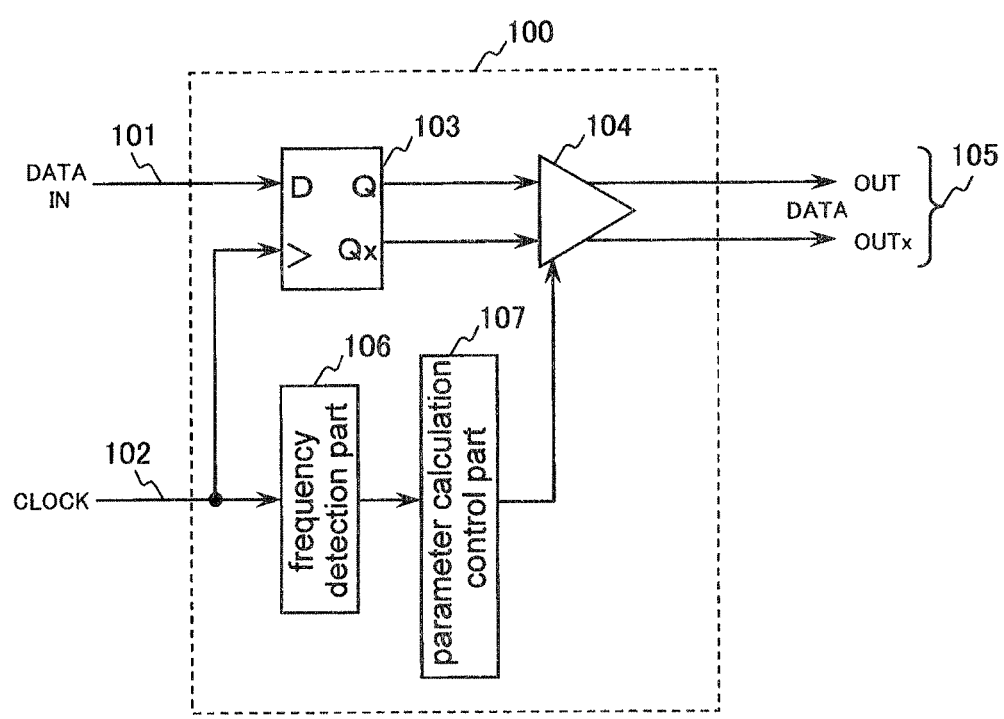
FIG. 1 illustrates a sending side interface circuit to which a parameter control circuit according to the present embodiment is applied.

FIG. 1 shows a configuration of a sending side interface circuit 100 in a transmission LSI (not shown in the drawing). The interface circuit 100 is configured of a D-latch circuit 103, an equalizer 104, a frequency detection part 106, and a parameter calculation control part 107.

The D-latch circuit 103 converts data 101 transmitted by the transmission LSI to complementary data synchronously with a clock 102 and outputs the converted data to the equalizer 104.

The equalizer 104 changes signal characteristics of the complementary data output from the D-latch circuit 103 according to a circuit parameter calculated by the parameter calculation control part 107 and outputs the complementary data 105 (OUT and OUTx) to the outside of the transmission LSI.

The frequency detection part 106 detects the frequency of the clock 102 and outputs the frequency to the parameter calculation control part 107.

The parameter calculation control part 107 calculates a circuit parameter of the equalizer 104 so that the equalizer 104 has optimum circuit characteristics at the frequency detected by the frequency detection part 106 and set the parameter to the equalizer 104.

Here, main components of the parameter control circuit according to the present embodiment are the frequency detection part 106, parameter calculation control part 107, and equalizer 104.

Figure 2:
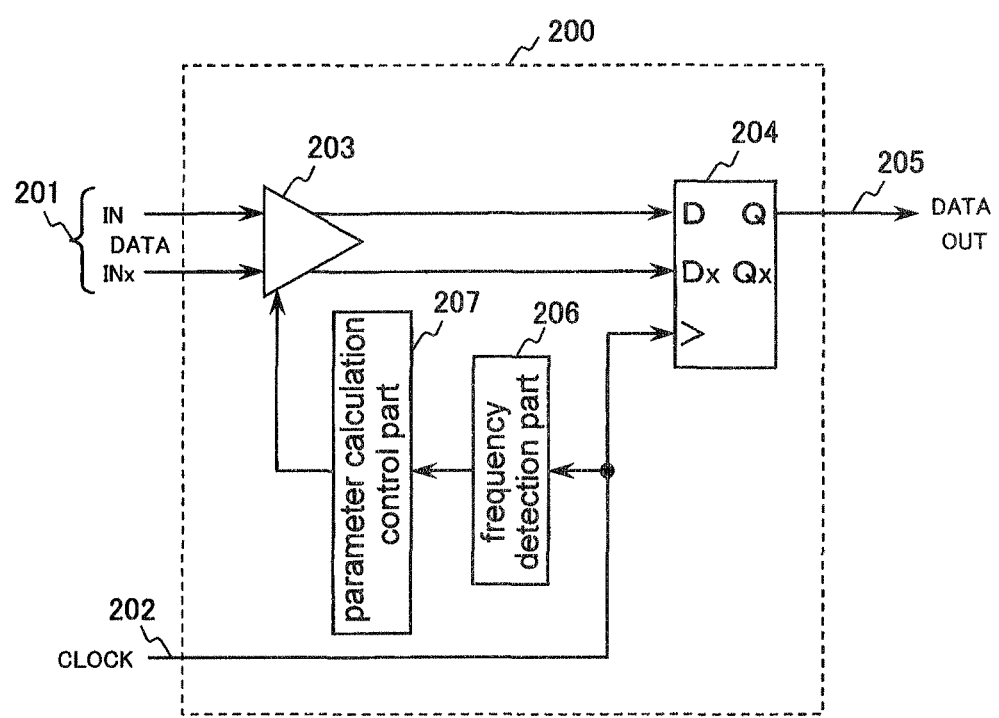
FIG. 2 illustrates a receiving side interface circuit to which the parameter control circuit according to the present embodiment is applied.

Next, FIG. 2 shows a configuration of a receiving side interface circuit 200 in the transmission LSI (not shown in the drawing). The interface circuit 200 is configured of an equalizer 203, a D-latch circuit 204, a frequency detection part 206, and a parameter calculation control part 207.

The equalizer 203 changes signal characteristics of complementary data 201 (IN and INx) received from the outside of the transmission LSI according to a circuit parameter calculated by the parameter calculation control part 207 and outputs the changed data to the D-latch circuit 204.

The D-latch circuit 204 synchronizes the complementary data output from the equalizer 203 with a clock 202 and outputs single pole data 205 into the transmission LSI.

The frequency detection part 206 detects the frequency of the clock 202 and outputs the frequency to the parameter calculation control part 207.

The parameter calculation control part 207 calculates a circuit parameter of the equalizer 203 so that the equalizer 203 has optimum circuit characteristics at the frequency detected by the frequency detection part 206 and sets the parameter to the equalizer 203.

Here, main components of the parameter control circuit according to the present embodiment are the frequency detection part 206, parameter calculation control part 207, and equalizer 203.

Note that the frequency detection part 206 and the frequency detection part 106 of FIG. 1, the parameter calculation control part 207 and the parameter calculation control part 107 of FIG. 1, and the equalizer 203 and the equalizer 104 of FIG. 1 are realized using the same circuitry, respectively. Examples of these components will be described in detail hereinafter.

Figure 3:
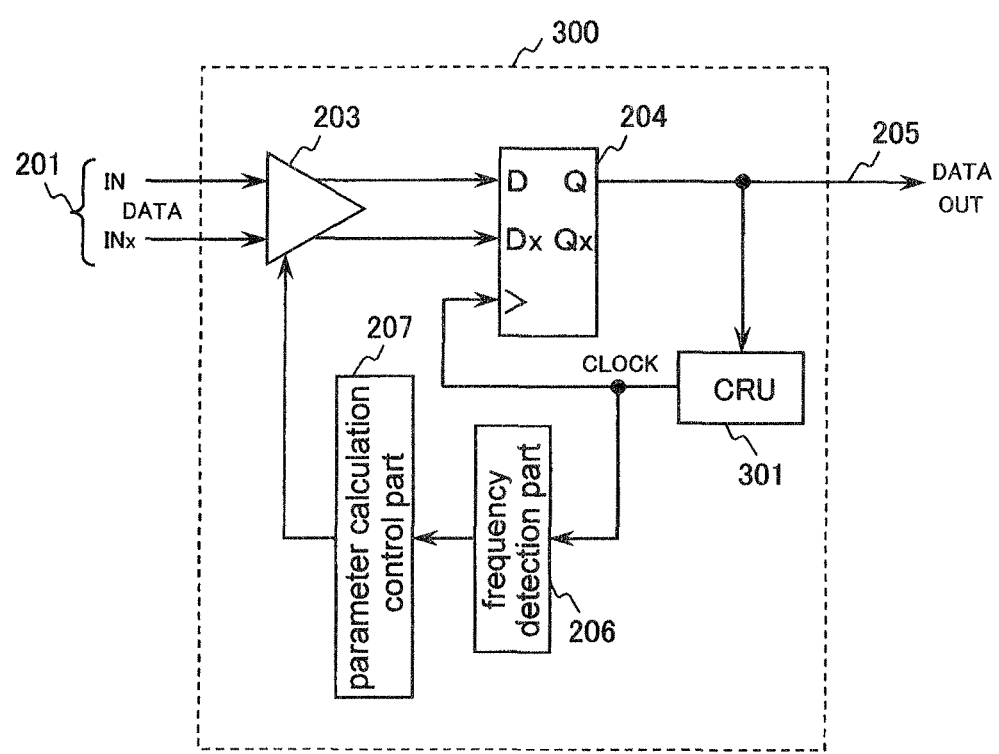
FIG. 3 illustrates a receiving side interface circuit to which the parameter control circuit according to the present embodiment is applied.

Next, FIG. 3 shows a configuration of a receiving side interface circuit 300 in a transmission LSI (not shown in the drawing). The interface circuit 300 is configured of the equalizer 203, the D-latch circuit 204, the frequency detection part 206, the parameter calculation control part 207, and a clock recovery circuit (CRU: Clock Recovery Unit) 301. While the interface circuit 300 is a receiving side interface circuit in the transmission LSI (not shown in the drawing) as same as in FIG. 2, the interface circuit 300 does not input a clock and inputs only the complementary data 201 (IN and INx). Note that the same symbols as in FIG. 2 indicate the same elements.

The complementary data 201 (IN and INx) is corrected by the equalizer 203 so that the equalizer 203 has optimum circuit characteristics using a circuit parameter calculated by the parameter calculation control part 207, and output to the D-latch circuit 204. The D-latch circuit 204 synchronizes the complementary data output from the equalizer 203 with a clock output from the clock recovery circuit 301 and outputs the single pole data 205 into the transmission LSI.

The clock recovery circuit 301 extracts a clock component from the data 205 and carries out clock recovery, and outputs the clock to the D-latch circuit 204 and the frequency detection part 206. For example, as a method recovering the clock, the data is sampled by a clock higher than the original data and edge parts (change points) of the data string are detected, and thereby the clock can be recovered from the edge period.

Hereinabove, there has been described the interface circuits to which the parameter control circuit according to the present embodiment can be applied. Next, embodiments of the parameter control circuit according to the present embodiment will be described.

Embodiment

Figure 4A:
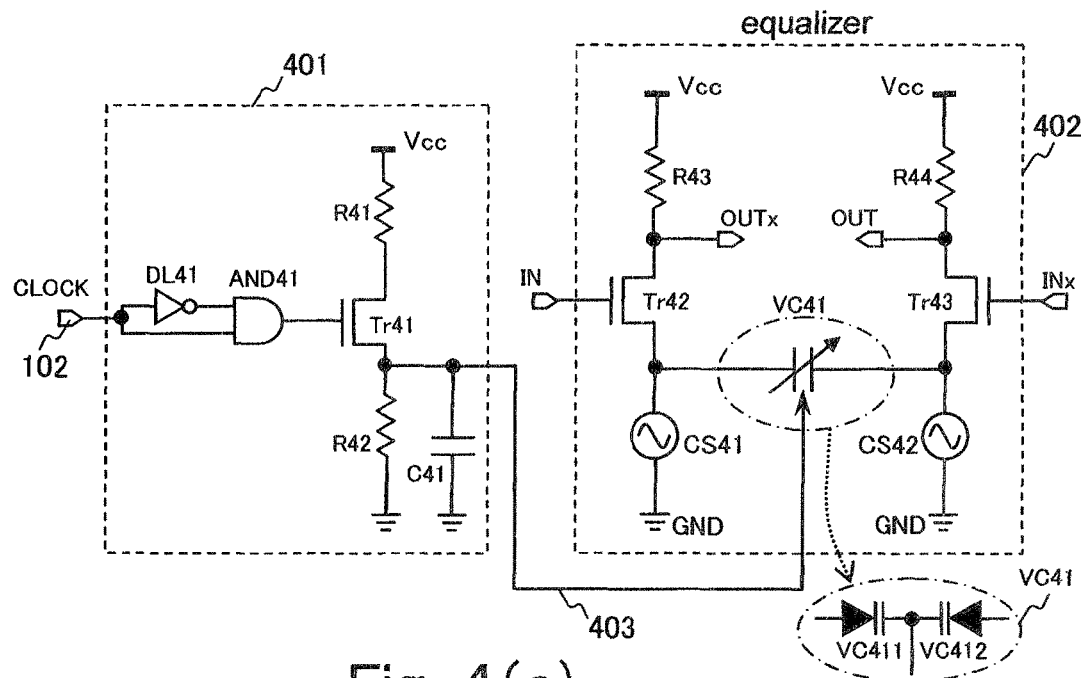
FIGS. 4(a) to 4(c) illustrate an aspect of the embodiment in the parameter control circuit according to the present embodiment.

A parameter control circuit according to a first embodiment is configured of the equalizer 104, frequency detection part 106, and parameter calculation control part 107 of FIG. 1, or the equalizer 203, frequency detection part 206, and parameter calculation control part 207 of FIG. 2. In FIG. 4(a), Symbol 401 indicates a circuit realizing the frequency detection part 106 or 206 and the parameter calculation control part 107 or 207. Further Symbol 402 indicates a circuit realizing the equalizer 104 or 203, and changes the characteristics thereof by a parameter output 403 output from the parameter calculation control part 107 or 207. Note that the parameter output 403 is given as a voltage value in the present embodiment.

The clock 102 is input into an inverting delay element DL41, which combines an inverter inverting logic and a delay element, and into an AND circuit AND41. The AND circuit AND41 makes a logic product of the clock 102 and the output of the inverting delay element DL41 and outputs the logic product to the gate of a transistor Tr41.

Figure 4B:
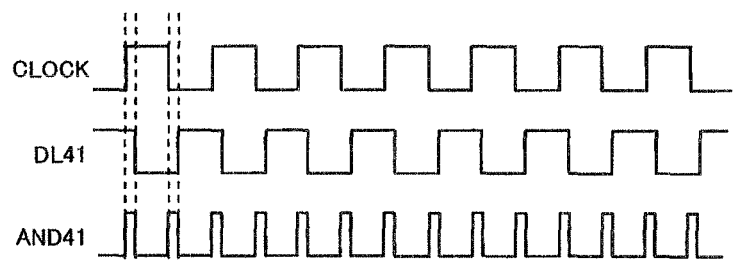
Figure 4C:
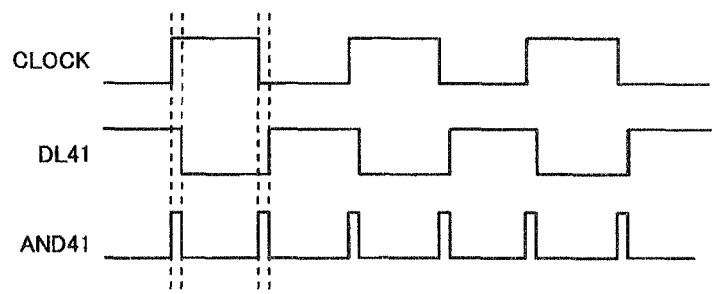

Here, a circuit configured of the inverting delay element DL41 and the AND circuit AND41 operates as shown in FIGS. 4(b) and 4(c). FIG. 4(b) shows a case of a high frequency in the clock 102 and FIG. 4(c) shows a case of a low frequency in the clock 102. An output signal of the inverting delay element DL41 is output slightly to be delayed from the clock 102 and the AND circuit AND41 outputs a pulse near the edge of the clock 102. This pulse is output in small numbers per unit time for the low frequency of the clock 102 and, on the other hand, output in large numbers per unit time for the high frequency of the clock 102.

Next, the output pulse of the AND circuit AND41 is input into the gate of the N-MOS (n-type Metal Oxide Semiconductor) transistor Tr41 and the transistor Tr41 performs ON-OFF switching operation in response to the pulse. The source of the transistor Tr41 is coupled to a power supply (Vcc) via a resistor R41 and the drain of the transistor Tr41 is coupled to the ground (GND) via a parallel circuit of a resistor R42 and a capacitor C41. When the pulse is output from the AND circuit AND41, the transistor Tr41 is turned on, and the capacitor C41 is charged to increase the voltage of a parameter output 403. On the other hand, when the pulse is not output from the AND circuit AND41, the transistor Tr41 is turned off, and the charge of the capacitor C41 is electrically discharged via the resistor R42 to reduce the voltage of the parameter output 403. That is, since the pulse is output in larger numbers from the AND circuit AND41 for the high frequency of the clock 102 as shown in FIG. 4(b), the capacitor C41 is charged more frequently to maintain the high voltage of the parameter output 403. On the other hand, since the pulse is output in smaller numbers from the AND circuit AND41 for the low frequency of the clock 102 as shown in FIG. 4(c), the capacitor C41 is charged but electrically discharged for a longer time to reduce the voltage of the parameter output 403. In this manner, the circuit 401 configuring the frequency detection part 106 and the parameter calculation control part 107 can change the voltage of the parameter output 402 according to the frequency of the clock 102.

Next, the equalizer 104 will be described. In FIG. 4(a), the equalizer 104 is based on a typical differential amplification circuit which is configured of nMOS transistors Tr42 and Tr43, resistors R43 and R44, and current generators CS41 and CS42. That is, a complementary signal configured of a non-inverting input IN and an inverting input INx is input and a complementary signal configured of a non-inverting signal OUT and an inverting signal OUTx is output. In particular, in the present embodiment, a variable capacitor VC41 is provided between the drain of the transistor Tr42 and the drain of the transistor Tr43 to change characteristics of the differential amplification circuit. For example, when the capacitance of the variable capacitor VC41 is increased, the frequency characteristics of the differential amplification circuit become wider, and, when the capacitance of the variable capacitor VC41 is decreased, the frequency characteristics of the differential amplification circuit become narrower.

Here, a varactor is given as an example to configure the variable capacitor VC41. When using the varactor, by coupling two varactors VC411 and VC412 back to back as shown in the drawing, it is possible to change the capacitance of the variable capacitor VC41 by the voltage of the parameter output 403. For example, when the voltage of the parameter output 403 is high, that is, the frequency of the clock 102 is high, the capacitance of the variable capacitor VC41 becomes large, and when the frequency of the clock 102 is low, the capacitance of the variable capacitor VC41 becomes small.

In this manner, the characteristics of the equalizer 104 can be changed according to the frequency of the clock 102, and also the equalizer 104 can be controlled so as to always have optimum circuit parameter according to the clock frequency used in the interface circuit. As a result, it becomes possible to realize data transmission without distortion and errors in the interface circuit inputting and outputting a signal which has multiple kinds of frequencies.

Embodiment

Figure 5:
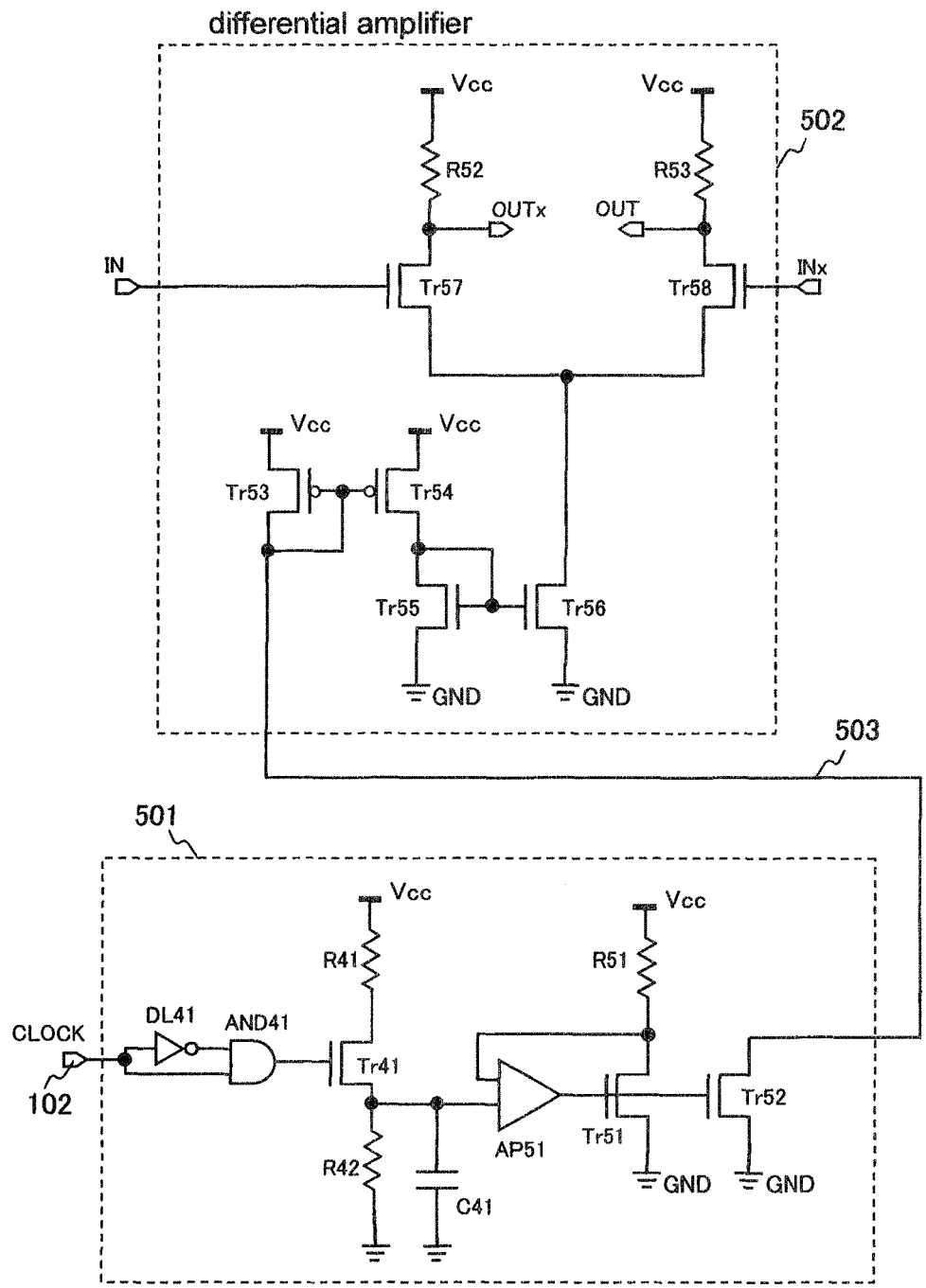
FIG. 5 illustrates an aspect of the embodiment of the parameter control circuit according to the present embodiment.

A parameter control circuit according to a second embodiment is configured of the frequency detection part 106 or 206, the parameter calculation control part 107 or 207, and the equalizer 104 or 203 in FIG. 1 to FIG. 3, as same as in the first embodiment. In FIG. 5, Symbol 501 indicates a circuit realizing the frequency detection part 106 or 206 and the parameter calculation control part 107 or 207. Further, Symbol 502 indicates a differential amplifier corresponding to the equalizer 104 or 203, and the differential amplifier changes the characteristics thereof by a parameter output 503 output from the parameter calculation control part 107 or 207. In the present embodiment, the parameter output 503 is given as a current value.

The clock 102 is input into the inverting delay element DL41 and the AND circuit AND41. Note that, in a circuitry until the clock 102 is input into an amplifier AP51, the same symbols as those in the first embodiment indicate the same elements which operate in the same manner and explanation thereof will be omitted. A voltage value according to the frequency of the clock 102 is input into the amplifier AP51. That is, into the amplifier AP51, a high voltage value is input when the frequency of the clock 102 is high and a low voltage value is input when the frequency of the clock 102 is low. The output of the amplifier AP51 is input into the gate of an nMOS transistor Tr51 coupled to Vcc via a resistor R51 and into the gate of an nMOS transistor Tr52, and controls the value of current flowing through the transistors TR51 and Tr52 according to the input voltage of the amplifier APSI. The source of the transistor Tr52 is input into the differential amplifier 502 as the parameter output 503. In the differential amplifier 502, a pair of pMOS (p-type Metal Oxide Semiconductor) transistors Tr53 and Tr54, into which current value of the parameter output 503 is input, and nMOS transistors TR55 and Tr56 configure a current mirror circuit and control the value of the current flowing through the transistor Tr56 according to the current value of the parameter output 503.

Meanwhile, the differential amplifier 502 is based on a typical differential amplification circuit configured of the nMOS transistors Tr57 and Tr58, resistors R52 and R53, and the transistor Tr56 which controls a bias current thereof. That is, the complementary signal of the non-inverting input IN and inverting input INx is input and the complementary signal of the non-inverting signal OUT and the inverting signal OUTx is output. In particular, in the present embodiment, by changing the bias current using the transistor Tr56, the characteristics of the differential amplification circuit can be changed. For example, when the current of the parameter output 503 is increased, the value of current flowing through the transistor Tr56 configuring the current mirror circuit is increased. That is, the bias current of the differential amplification circuit is increased and the differential amplification circuit can be operated in high speed to accommodate a high frequency signal, although power consumption increases. On the other hand, the current of the parameter output 503 is decreased, the value of current flowing through the transistor Tr56 configuring the current mirror circuit is decreased. That is, the bias current of the differential amplification circuit is decreased and the differential amplification circuit can accommodate a low frequency signal with small power consumption.

In this manner, the characteristics of the differential amplifier 502 can be changed according to the frequency of the clock 102 and the differential amplifier 502 can be always controlled to have optimum circuit parameter according to the clock frequency used in the interface circuit. As a result, it becomes possible to realize data transmission without distortion and errors, while suppressing power consumption, in the interface circuit inputting and outputting a signal which has various kinds of frequencies.

Embodiment

Figure 6:
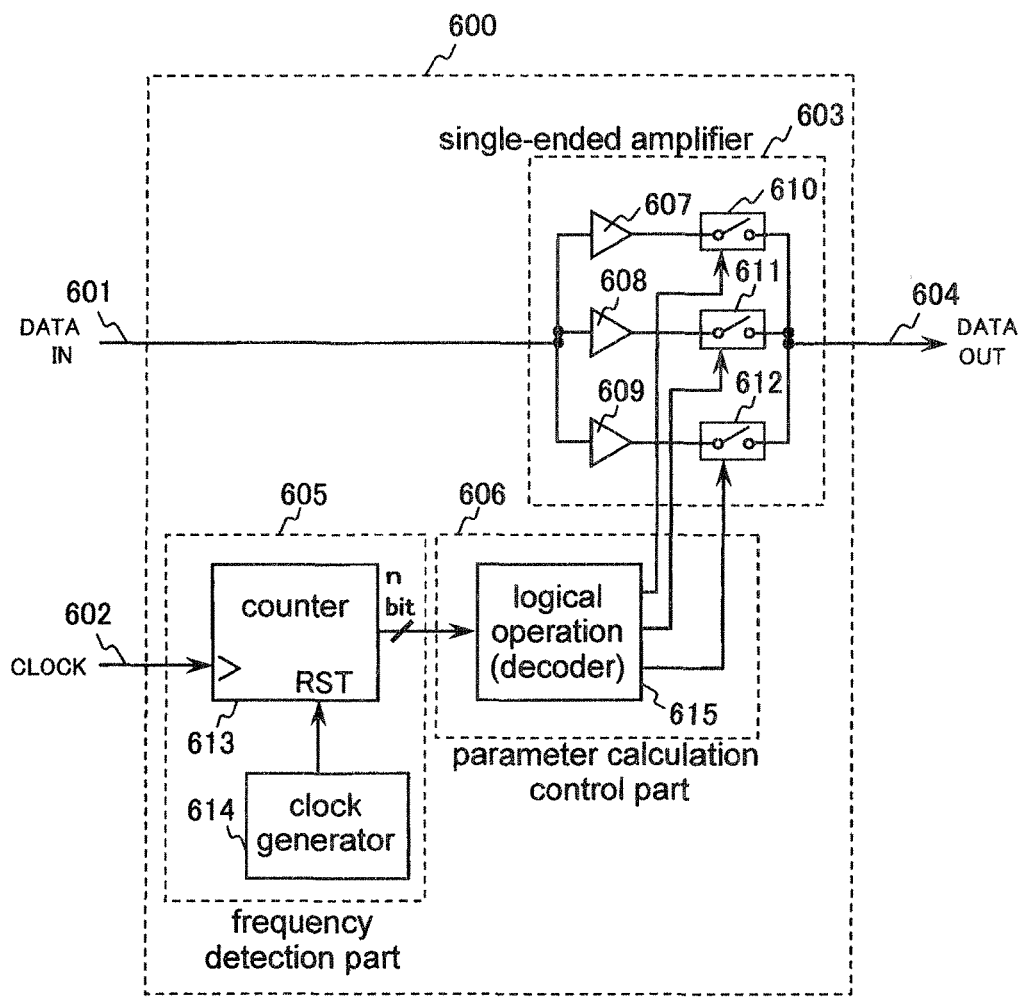
FIG. 6 illustrates an aspect of the embodiment of the parameter control circuit according to the present embodiment.

A parameter control circuit according to a third embodiment controls the characteristics of the equalizer digitally. In FIG. 6, Symbol 600 indicates an interface circuit inputting data and a clock and outputting data as same as the interface circuit of FIG. 1 or FIG. 2. Symbol 601 indicates a data input, Symbol 602 indicates a clock, Symbol 603 indicates a single-ended amplifier, Symbol 604 indicates a data output, Symbol 605 indicates a frequency detection part detecting a clock frequency of the clock 602 and outputting an n-bit digital code, and Symbol 606 indicates a parameter calculation control part setting a circuit parameter of the single-ended amplifier 603 according to the detected n-bit frequency value output from the frequency detection part 605. Note that, in the drawing, main components including the parameter control circuit according to the present embodiment are the frequency detection part 605, parameter calculation control part 606, and single-ended amplifier 603.

The single-ended amplifier 603 corresponds to the equalizer 104 or 203 and can change the characteristics thereof. In the single-ended amplifier 603, buffer amplifiers 607 to 609 and switches 610 to 612 coupled in series to the respective buffer amplifiers couples the data input 602 and the data output 604 in parallel. That is, when the switch 610 is turned on, the buffer amplifier 607 couples the data input 602 and the data output 604, and, when the switch 611 is further turned on, the buffer amplifiers 607 and 608 couple the data input 602 and the data output 604. Similarly, when the switches 610 to 612 are turned on, the buffer amplifiers 607 to 609 couple the data input 602 and the data output 604 in parallel.

Generally, when the number of buffer amplifiers coupled in parallel is increased and the current capable of flowing through the circuit is increased, high speed operation becomes possible. On the other hand, when the current capable of flowing through the circuit is decreased, the high speed operation is difficult to achieve. Here, optimum operation condition is always required, since the increase of the current flowing through the circuit also increases power consumption. Note that, while the number of the parallel circuits of the single-ended amplifier 603 is three in the present embodiment, it is obvious that the similar effect can be obtained with multiple circuits other than the three circuits.

Next, a configuration of the frequency detection part 605 will be described. The frequency detection part 605 is configured of a counter 613 and a clock generator 614, for example. The counter 613 counts the clock 602, and the counter 613 is reset on receiving a reset (RST) signal. At the same time, the counter 613 latches the count value (n bits) at that point and outputs the count value to the parameter calculation control part 606. The clock generator 614 outputs the RST signal to the counter 613. Note that the clock generator 614 may be or may not be synchronized with the clock 602, and resets the counter 613 every fixed interval with a frequency sufficiently lower than that of the clock 602. That is, the counter 613 counts the clock 602 for the fixed interval and outputs the count value to the parameter calculation control part 606. Accordingly, when the frequency of the clock 602 is high, the count value counted for the fixed interval increases, and, on the other hand, when the frequency of the clock 602 is low, the count value counted for the fixed interval decreases. In this manner, the n-bit count value is output to the parameter calculation control part 606 according to the frequency level.

Next, a configuration example of the parameter calculation control part 606 will be described. The parameter calculation control part 606 is configured of a logical operation circuit (decoder) 615. The decoder 615 receives the n-bit count value according to the frequency level from the frequency detection part 605 and then turns on or off the switches 610 to 612 in the single-ended amplifier 603 according to the count value. At this time, when the n-bit count value input from the frequency detection part 605 is large, large numbers of the switches in the single-ended amplifier 603 are turned on to increase the number of the buffer amplifiers inserted between the data input 602 and the data output 604 to make the high speed operation available. On the other hand, when the n-bit count value input from the frequency detection part 605 is small, the high speed operation is not necessary and small numbers of the switches in the single-ended amplifier 603 are turned on to reduce the number of the buffer amplifiers inserted between the data input 602 and the data output 604 for suppressing power consumption.

In this manner, the characteristics of the single-ended amplifier 603 can be changed according to the frequency of the clock 602 and the single-ended amplifier 603 can be controlled so as to always have optimum circuit parameter according to the clock frequency used in the interface circuit. As a result, it becomes possible to realize data transmission without distortion and errors, while suppressing power consumption, in the interface circuit inputting and outputting a signal which has multiple kinds of frequencies.

Note that, even in the interface circuit which does not have a clock input such as the interface circuit of FIG. 3, the clock 602 can be realized similarly by providing the clock recovery circuit 301 recovering the clock inside.

Embodiment

A parameter control circuit according to a fourth embodiment is a circuit having a configuration combining those of the first to third embodiments. The first to third embodiments use the analog voltage value, analog current value, or digital data as the parameter controlling the characteristics of the equalizer and making only one equalizer to be an object to control. In an actual interface circuit, however, there exist multiple portions, the characteristics of which are to be adjusted, within the interface circuit such as a receiving side, a transmitting side, and further a clock circuit distributing a clock, for example. In the parameter control circuit of the present embodiment shown in FIG. 7, a part of the frequency detection part or the parameter calculation control part is shared to change the characteristics of multiple equalizers.

Figure 7:
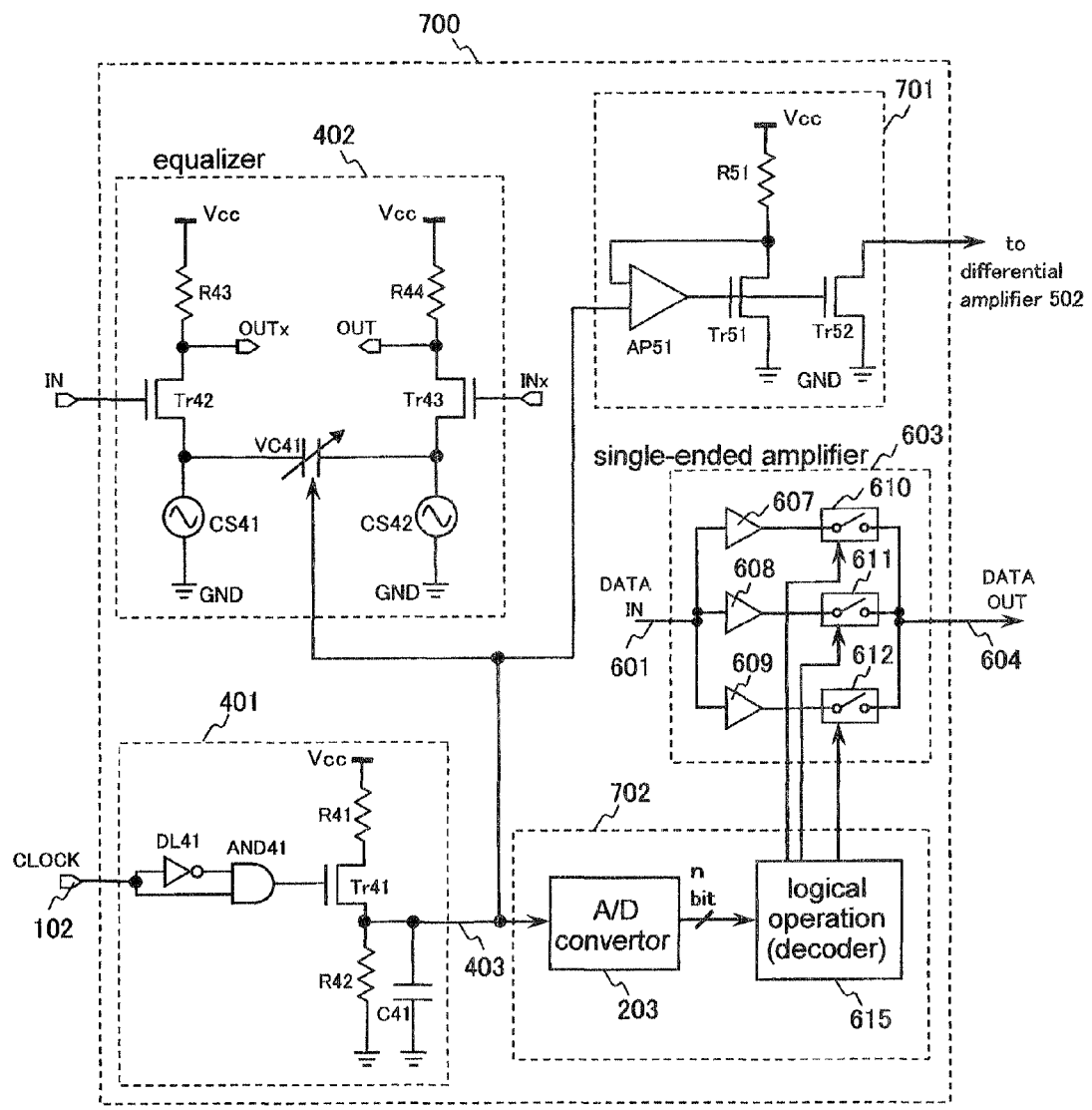
FIG. 7 illustrates an aspect of the embodiment of the parameter control circuit according to the present embodiment.

In the parameter control circuit 700 of FIG. 7, Symbol 701 indicates an analog parameter calculation control part, which has the same circuit as a part of the circuit 501 of FIG. 5, performing current value control, and Symbol 702 indicates a digital parameter calculation control part. The decoder 615 in the digital parameter calculation control part 702 operates as same as in FIG. 6. The detection of the frequency is performed not by the digital type used in the frequency detection part 605 of FIG. 6 but by the analog type as same as that in FIG. 4, and the parameter output 403 of the analog voltage is converted to n-bit digital data by the A/D converter 203 to be input into the decoder 615. Note that the same symbols as those of FIG. 4 to FIG. 6 indicate the same elements and explanation thereof will be omitted.

In this manner, the parameter control circuit 700 of FIG. 7, by sharing one frequency detection part configured of the circuit 401, can simultaneously control the characteristics of the multiple equalizers such as the equalizer 402 controlling the circuit characteristics thereof by the parameter of the voltage value, the differential amplifier 502 controlling the circuit characteristics thereof by the parameter of the current value, and the single-ended amplifier 603 controlling the circuit characteristics thereof by the parameter of the digital data.

As a result, in the interface circuit inputting and outputting a signal which has various frequencies, it is possible to change the characteristics of the equalizers in the multiple portions and to control the equalizers so as to have optimum circuit parameters according to the frequency of the input and output signal. In addition, by sharing a circuit such as the frequency detection part, it is possible to reduce a circuit scale. Further, since the characteristics of the equalizers in the multiple portions are made uniform by sharing a circuit such as the frequency detection part, it is possible to realize an interface circuit having stable characteristics.

Embodiment

Figure 8:
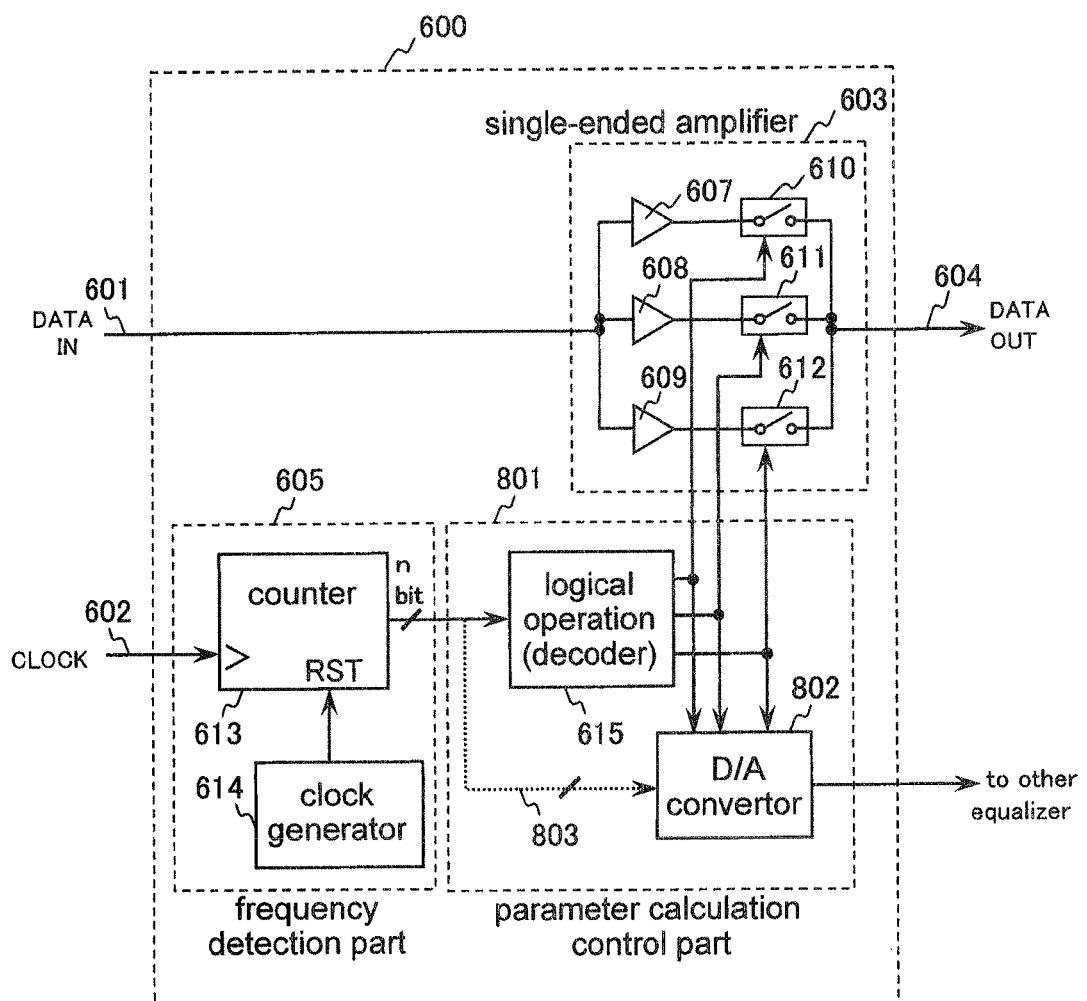
FIG. 8 illustrates an aspect of the embodiment of the parameter control circuit according to the present embodiment.

A parameter control circuit according to a fifth embodiment shown in FIG. 8 is an application example of the digital type parameter control circuit of the third embodiment. Only a configuration of a parameter calculation control part 801 is different from that of the parameter calculation control part 606 of FIG. 6, and other parts thereof are the same as those of FIG. 6 and explanation thereof will be omitted.

In the parameter calculation control part 801, the n-bit frequency value output from the frequency detection part 605 is input into the decoder 615 and an output of the decoder 615 controls ON or OFF of the switches 610 to 612 in the single-ended amplifier 603. At the same time, the output of the decoder 615 is also input into a D/A converter 802 and a voltage value according to the output value of the decoder 615 is output. Note that, at this time, without inputting the output of the decoder 615 into the D/A converter 802, the n-bit signal 803 may be input into the D/A converter 802. In this case, a voltage value according to the count value in the frequency detection part 605 is output from the D/A converter 802 to an equalizer. Further, a component to which the parameter of the voltage value output from the D/A converter 802 is to be output is the equalizer 402 capable of controlling the characteristics thereof by the voltage value as shown in FIG. 4, for example.

In this manner, while operating the frequency detection part 605 and the parameter calculation control part 801 digitally, it becomes possible to control the equalizer 401 which is to be controlled by the analog voltage, at the same time. By the control using the digital code, compatibility to a computer is improved and it becomes possible to calculate the parameter in software processing using a program. As a result, in the interface circuit inputting and outputting a signal which has various frequencies, the characteristics of equalizers in multiple portions are controlled digitally according to the frequency of the input and output signal and the characteristic can be easily changed for each of the equalizers.

Embodiment

While the first to fifth embodiments control the characteristics of the equalizer in the data input/output part of the interface circuit so as to have optimum characteristics according to the clock frequency, a parameter control circuit according to a sixth embodiment is an example applied to a PLL (Phase Locked Loop) circuit generating a clock instead of the equalizer.

Figure 9A:
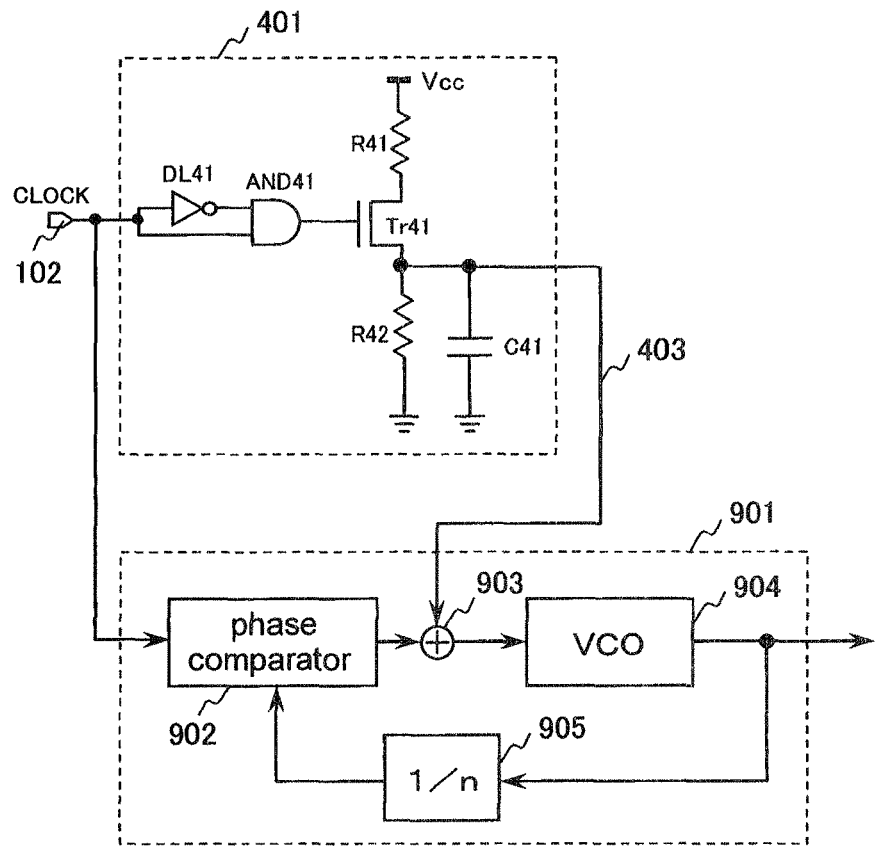
FIGS. 9(a) and 9(b) illustrate an aspect of the embodiment of the parameter control circuit according to the present embodiment.

In FIG. 9(a), the circuit 401 performing the frequency detection of the clock input 102 and the parameter calculation is the same as that in FIG. 4 and explanation thereof will be omitted. A PLL circuit 901 generates a clock having a frequency according to the parameter output 403 output from the circuit 401. In the PLL circuit 901, Symbol 902 indicates a phase comparator comparing the phase of the clock 102 and the phase of an output of a 1/n frequency dividing circuit 905 and outputting a voltage value corresponding to a shift between the phases, Symbol 903 indicates an adder adding a voltage value output from the phase comparator 902 and the voltage value of the parameter output 403, and Symbol 904 indicates a VCO (Voltage Controlled Oscillator) changing the frequency of a clock generated according to the voltage value output from the adder 903. The output of the VCO 904 is output to the phase comparator 902, after the frequency thereof has been divided into a frequency close to the frequency of the clock 102 by the frequency dividing circuit 905. By changing a dividing ratio in the frequency dividing circuit 905, it is possible to obtain a desired oscillation frequency of the VCO.

Figure 9B:
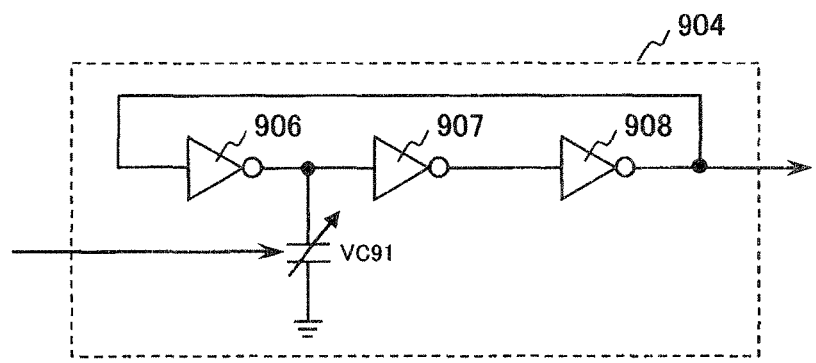

Next, a configuration example of the VCO 904 is shown in FIG. 9(b). Inverters 906, 907, and 908 are coupled in a loop, and a variable capacitor VC91 coupled between the output of the inverter 906 and the input of the inverter 907 is grounded. The circuit oscillates by the odd numbers of inverters 906 to 908 and an output of the inverter 908 becomes an output clock of the VCO 904. At this time, the capacitance of the variable capacitor VC91 forms a kind of filter together with a signal line between the inverter 906 and the inverter 907.

By changing the capacitance of the variable capacitor VC91, the characteristics of the filter is changed and the frequency of the oscillation of the three inverters 906 to 908 is changed. For example, when the capacitance of the variable capacitor VC91 is increased, the clock frequency of the oscillation in the VCO 904 decreases, and, on the other hand, when the capacitance of the variable capacitor VC91 is decreased, the clock frequency of the oscillation in the VCO 904 increases. That is, when the clock frequency of the clock 102 increases, the frequency of the clock generated in the PLL circuit 901 also increases, and, on the other hand, when the clock frequency of the clock 102 decreases, the frequency of the clock generated in the PLL circuit 901 also decreases.

Note that the variable capacitor VC91 is configured of varactors or the like such as VC411 and VC412 of FIG. 4, for example. Further, while the parameter output 403 and the output of the phase comparator 902 are added by the adder 903 and then input into the VCO 904 in the present embodiment, another variable capacitor as same as the variable capacitor VC91 may be provided in the VCO 904 between the output of the inverter 907 and the input of the inverter 907, for example, instead of the adder 903 and the variable capacitors may be controlled by the output of the phase comparator 902 and the parameter output 403, respectively.

In this manner, by controlling the frequency in the PLL circuit using the frequency detection part and the parameter calculation control part, it is possible to change the frequency of the clock generated in the PLL circuit according to the clock frequency used in the interface circuit or the like.

As described in each of the embodiments hereinabove, the parameter control circuit according to the present embodiment can set automatically the circuit parameter according to the frequency used in the interface circuit and the clock circuit and, even when the kinds of the operation speeds are increased and the operation modes are diversified, can set automatically the parameter according to the frequency to be used.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A parameter control circuit, comprising:
an interface circuit inputting and outputting data and a clock that have multiple speeds;
a frequency detection part detecting a frequency of a clock which is input into the interface circuit or a frequency of a clock of the data;
a differential equalizer including a first transistor and a second transistor which receive a complementary signal, the differential equalizer changing characteristics of the interface circuit; and
a parameter calculation control part calculating a circuit parameter of the differential equalizer and controlling characteristics of the differential equalizer according to the frequency detected by the frequency detection part,
wherein the differential equalizer is controlled based on the circuit parameter and includes a variable capacitor which is coupled between a drain of the first transistor and a drain of the second transistor, wherein the variable capacitor includes a plurality of varactors.

2. The parameter control circuit according to claim 1, wherein
the parameter calculation control part outputs the circuit parameter as an analog voltage and controls the characteristics of the equalizer by the analog voltage.

3. A parameter control circuit, comprising:
an interface circuit inputting and outputting data that have multiple speeds;
a frequency detection part detecting a frequency of a clock which is input into the interface circuit or a frequency of a clock of the data;
an equalizer changing characteristics of the interface circuit;

a parameter calculation control part calculating a circuit parameter of the equalizer and controlling characteristics of the equalizer according to the frequency detected by the frequency detection part;
an analog to digital converter converting the analog voltage output of the parameter calculation control part to a digital code;
a decoder decoding a digital code and outputting a decode signal; and
a single-ended amplifier receiving the decode signal, wherein
the single-ended amplifier includes a plurality of buffers coupled in parallel and a plurality of switches that are coupled to each of the buffers and are controlled by the decode signal.

4. A parameter control circuit, comprising:
an interface circuit inputting and outputting data that have multiple speeds;
a frequency detection part detecting a frequency of a clock which is input into the interface circuit or a frequency of a clock of the data;
an equalizer changing characteristics of the interface circuit; and
a parameter calculation control part calculating a circuit parameter of the equalizer and controlling characteristics of the equalizer according to the frequency detected by the frequency detection part, wherein
the parameter calculation control part outputs the circuit parameter as an analog current;
the equalizer includes a current mirror circuit which includes a first transistor, a second transistor, a third transistor, and a fourth transistor, and includes a differential amplifier which is coupled to the fourth transistor, wherein the analog current is supplied to the first transistor and the second transistor.

5. The parameter control circuit according to claim 1, further comprising
a clock recovery part recovering a clock from the data.

6. The parameter control circuit according to claim 1, wherein
the varactors are coupled in series and the circuit parameter is supplied to a node between the varactors coupled in series.

7. The parameter control circuit according to claim 2, wherein
the varactors are coupled in series and the circuit parameter is supplied to a node between the varactors coupled in series.

* * * * *